(12) United States Patent
Baydoun et al.

(10) Patent No.: US 8,022,304 B2
(45) Date of Patent: Sep. 20, 2011

(54) GROMMET

(75) Inventors: Mohammed Michael Baydoun, Dearborn Heights, MI (US); Anthony Dowling DeWitt, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 12/479,307

(22) Filed: Jun. 5, 2009

(65) Prior Publication Data

US 2010/0307794 A1 Dec. 9, 2010

(51) Int. Cl.
*H01B 17/26* (2006.01)

(52) U.S. Cl. .......... 174/152 G; 174/665; 16/2.2; 248/56

(58) Field of Classification Search .............. 174/153 G, 174/152 G, 665; 248/56; 16/2.1, 2.2; 439/604, 439/587
See application file for complete search history.

(56) References Cited

U.S. PATENT DOCUMENTS

| | | | |
|---|---|---|---|
| 4,685,173 A * | 8/1987 | Pavur .................. | 16/2.2 |
| 5,711,732 A | 1/1998 | Ferenc et al. | |
| 6,339,196 B1 * | 1/2002 | Uchida ............... | 174/153 G |
| 6,465,740 B2 | 10/2002 | Kondoh et al. | |
| 6,541,703 B2 * | 4/2003 | Nakata ................ | 174/650 |
| 6,727,432 B2 * | 4/2004 | Sato ................... | 174/663 |
| 6,815,615 B1 | 11/2004 | Haulotte et al. | |
| 6,897,380 B2 | 5/2005 | Sakata et al. | |
| 7,026,549 B1 | 4/2006 | Smutny et al. | |
| 7,098,401 B1 | 8/2006 | Herald et al. | |
| 7,189,930 B2 * | 3/2007 | Murakami ........... | 174/650 |

FOREIGN PATENT DOCUMENTS

JP 2002233035 A 8/2002

OTHER PUBLICATIONS

Amphe-Power Connectors with RADSOK Technology.

* cited by examiner

*Primary Examiner* — Dhirubhai R Patel
(74) *Attorney, Agent, or Firm* — Raymond L. Coppiellie; Brooks Kushman P.C.

(57) ABSTRACT

A grommet providing triple sealing feature when mounted in an opening of a panel is disclosed. When the panel into which the grommet is mounted is between a compartment exposed to ambient conditions and a passenger compartment, a seal minimizes water, fumes, dust, and noise from entering into the passenger compartment. The triple seal, according to an embodiment, provides higher sealing forces than shown previously. The disclosed grommet can be engaged with a flat, non-flanged panel as well as a panel having a flange near the opening. The disclosed grommet has multiple longitudinal slits sawed through a tubular portion of the grommet through which the wiring harness is threaded. The cuts allow a subset of wires to be splayed out from the grommet at a different routing than the remainder of the wires in the wiring harness bundle.

4 Claims, 5 Drawing Sheets

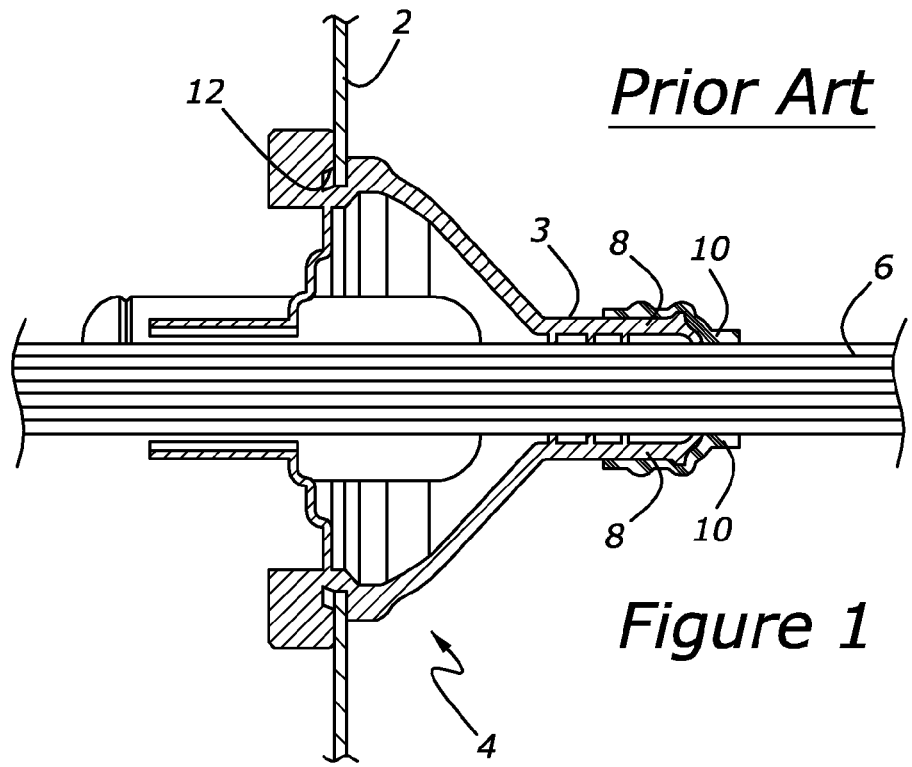
Figure 1 — Prior Art
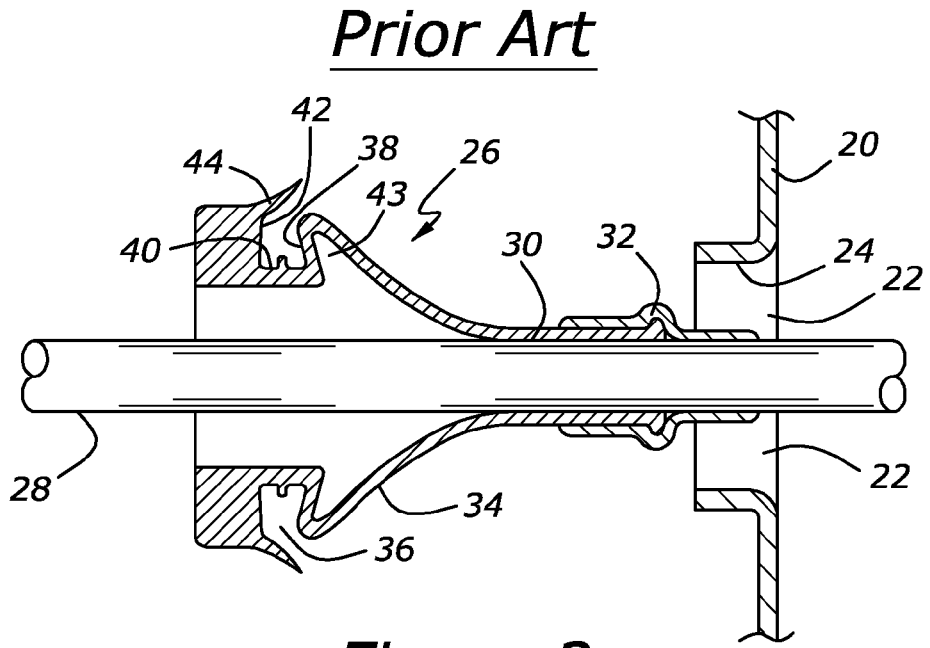
Figure 2 — Prior Art

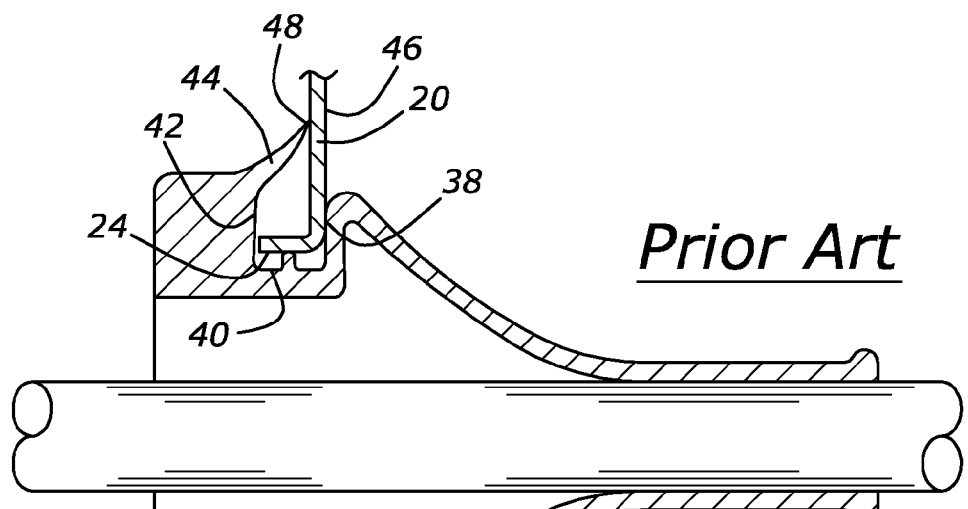
Prior Art
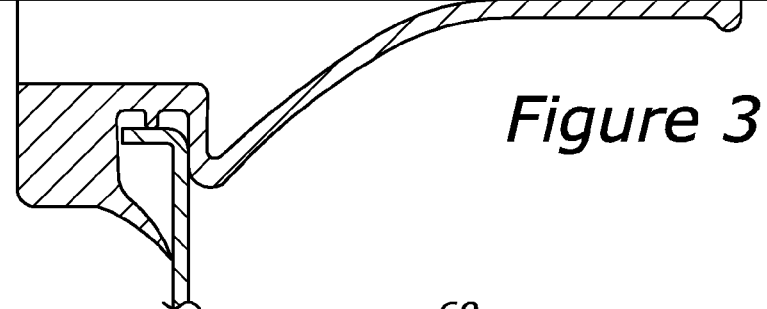
Figure 3
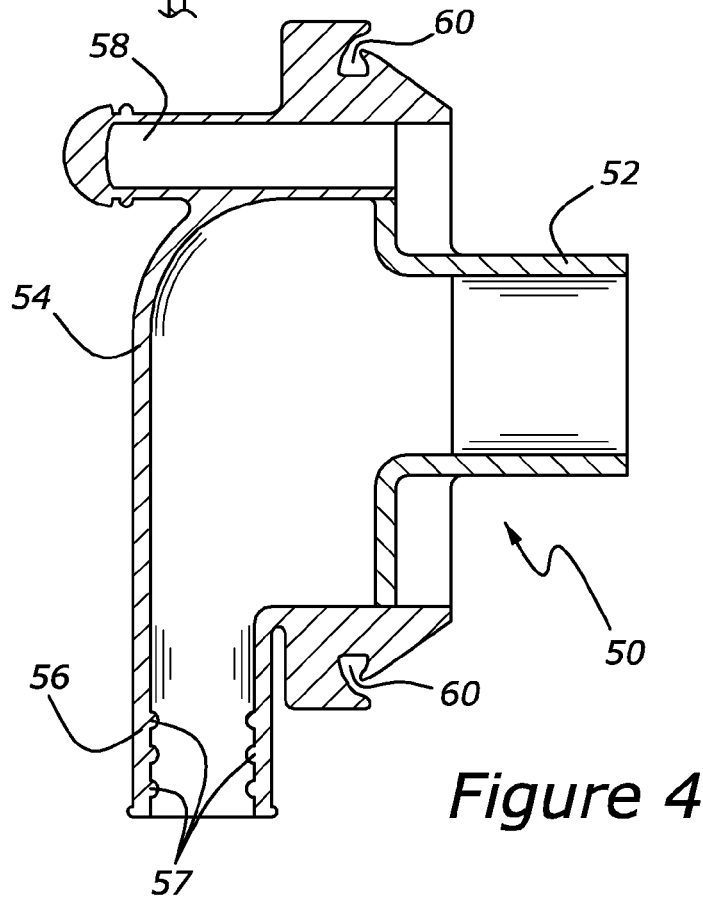
Figure 4

GROMMET

BACKGROUND

1. Technical Field

The present development relates to grommets and more particularly to sealing an opening in a panel.

2. Background Art

In automotive vehicle applications, there are various vehicle body panels through which a wiring harness is passed, such as the firewall or door panels. Typically, an opening is punched, or otherwise formed, in the body panel. A grommet is fitted into the opening, with the grommet having a passage through which the wiring harness can be threaded. A cross-section of a grommet installed into a body panel, according to the prior art, is shown in FIG. 1. A body panel 2 has an opening into which a grommet 4 is installed. Grommet 4 has multiple wires forming a wiring harness 6 passing through a tubular portion 8 of grommet 4. Typically, tape 10 is wrapped around the wiring harness 6. Grommet 4 has a channel 12 (or groove) into which a portion of panel 2 near the opening is held. The opening in panel 2 and channel 12 are sized to cooperate when installed. On either side of channel 12, grommet 4 is larger in circumference than the opening in panel 2. An insertion force is applied to grommet 4 so that one of the sides adjacent to channel 12, which is larger than the opening in panel 2, deforms. As inserted, an edge of the opening of panel 2 is engaged with channel 12 with contact on three sides of channel 12.

The grommet is provided for a number of reasons. If the panel through which the wires travel is between an inside compartment and a harsher environment, the grommet provides a seal so that water, fumes, dust, etc. that might be part of the harsher environment are largely prevented from entering the inside compartment. If the grommet is placed in a body panel with a noisy environment on one side, another function of the grommet is to limit the transmission of noise from one side to the other through the opening in the panel.

Some body panels through which wires may be passed are sufficiently stiff preventing excessive deformation when a grommet is inserted and providing a surface to which the grommet can be secured and sealed. Such an example is shown in FIG. 1, where panel 2 is flat, or nonflanged, at the opening.

In some applications, a flange is formed on the panel opening, an example of which is shown in FIGS. 2 and 3, according to the prior art. Panel 20 has an opening 22 with a flange 24 formed near opening 22. Flange 24 resists deformation in panel 20 in the region around opening 22. In FIG. 2, grommet 26 is shown uninstalled. Grommet 26 has a wiring harness 28 inserted through a cylindrical portion 30 of grommet 26. Tape 32 is applied near a tip of grommet 26. In the example shown in FIG. 2, grommet 26 has a conical section 34. Grommet 26 has a channel 36 for accepting plate 20. Channel 36 has a first surface 38, second surface 40, and third surface 42. Extending from third surface 42 is a lip 44.

In FIG. 3, grommet 26 is shown installed into opening 22 of panel 20. Surface 40 has a raised portion on which flange 24 rests. First surface 38 contacts a first side 46 of panel 20. A second side 48 of panel 20 is in contact with a tip of lip 44. Because the tip is thin in cross section, it deforms readily and provides little force on panel 20 when installed. Consequently, the sealing force is minimal. Also, grommet surface 38 deforms easily because it is a thin wall. When deformed upon engagement with panel 20, it contacts side 46 of panel 20 along the length of first surface 38.

It is known to design channels in grommets to accommodate non-flanged panel openings, such as shown in FIG. 1, and to accommodate flanged panel openings, such as shown in FIG. 3. It would be desirable, however, to have a single grommet design that can be used for both flanged and non-flanged panel openings and one that exerts a strong sealing force to prevent water, dust, fumes, noise, etc. to pass through the grommet.

SUMMARY

A grommet is disclosed which is adapted to engage with an opening in a panel of predetermined thickness. The thickness of the panel in, for example, a vehicle door application, is as thin as 0.7 millimeters (mm). In an automotive firewall, the thickness is 1 mm or greater. In other applications the panel is as thick at 3 mm. The grommet is a unitary molded piece made of an elastomeric material having first and second tubular portions through which a wire harness is passed. The grommet has a body portion with the first tubular portion extending from a first side of the body portion and the second tubular portion extending from a second side of the body portion. The body has a channel with a bottom surface of a channel having a predetermined width, a first side wall, the first side wall having a first lip extending generally toward a center of the channel, the first lip being distally located with respect to the bottom surface, and a second side wall, the second side wall having a second lip extending generally toward the first lip, the second lip being distally located with respect to the bottom surface. The second lip overlaps the first lip by more than the predetermined thickness when the grommet is not engaged with a panel, i.e., uninstalled. A cross-section of the tip generally has the shape of a half circle. In one embodiment, the diameter of the half circle is about 2 mm and the predetermined width (distance between the first side wall and the second side wall) is about 4 mm.

The channel can engage a non-flanged panel or a flanged panel having a flange not greater than the predetermined width. The grommet has a body portion with a wall around its periphery in which the channel is formed and a first surface extending across a first end of the wall and a second surface extending across a second end of the wall. The first surface slopes out toward the first tubular portion and has a plurality of generally trapezoidal ribs, in cross section, extending outward. A first portion of ribs have a first width and a second portion of ribs have a second width, the second width being at least twice as wide as the first width.

The second tubular portion has a plurality of slits cut through the second tubular portion and the slits are generally parallel with an axis of the second tubular portion. The second tubular portion has at least one ridge on an internal surface of the second tubular portion.

Also disclosed is a method to manufacture a grommet having a body, a first tube protruding from a first surface of the body, a second tube protruding from a second surface of the body, a wall around a periphery of the body, the wall being adjacent to the first surface on one end of the wall, the wall being adjacent to the second surface on another end of the wall, and the wall having a channel formed therein. The method includes molding the grommet and sawing at least two vertical slits in the first tube, the slits extending from a distal end to the proximate end with the slits roughly parallel to the axis of the first tube. The method may also include sawing at least two horizontal slits into the first surface starting at the proximate end of the vertical slits and arranged contiguously with the vertical slits. The width of the vertical slits is less than about 1 mm.

An advantage of the present development is that lips adjacent to the channel overlap by at least the thickness of the panel to which it is to be engaged, thereby providing a strong sealing force between the lop and the panel. This overlap exerts a strong force to seal the panel by virtue of the tips of the lips pressing on either side of the panel. A third seal is provided between the bottom of the channel and the opening surface of the panel when the size and shape of the panel opening is equally sized and shaped to match the channel in the grommet. In this way, a friction seal is formed between the inside surface of the panel opening and the bottom surface of the channel. This provides a triple seal to prevent ambient fumes, dust, air, noise, etc. from passing through the panel in the vicinity of the opening.

Yet another advantage of the present development is that by providing a wide bottom surface of the channel and an overlap of the sealing lips, a single grommet is capable of engaging with a flanged or non-flanged panel with sufficient sealing force. By doing so, the number of different parts that a manufacturer purchases is reduced. Parts complexity and the number of parts that are inventoried are also reduced.

The present development yields another advantage in that by sawing the slits in the tubular portions of the grommet, the resulting slit is smaller in width than that which can be molded in place. As described below in more detail, the purpose of the slits is to yield a greater flexibility in the grommet application. In some applications, the slits are not used because the wiring harness passing through the tubular portion simply traverses straight through the tube of the grommet. In such cases, the tubular portion is taped up and the sawed slits fit together with little or no gap yielding a tight seal. In other applications, subsets of the wires of the wiring harness are splayed out due to packaging constraints. In one example, a subset of the wires is routed along the panel and thus cannot accommodate traversing through the tube of the grommet prior to attaining such orientation. Furthermore, various subsets of the wires of the wiring harness may be routed in different directions immediately on the other side of the panel.

To accommodate this, the prior art has slits molded in the grommet. However, the tubular portions on either side of a molded slit do not mate well and provide a less than optimal seal when taped. Also, molded slits are wider and don't seal well.

Because the grommet, according to the present development, provides two surfaces covering the opening in the panel, there are two barriers to noise transmission over the opening in the panel. It was found that the noise transmitted is reduced by 20% by having a second surface barrier.

BRIEF DESCRIPTION OF THE DRAWINGS

FIG. 1 is a cross-sectional representation of a grommet according to the prior art;

FIGS. 2 and 3 are cross-sectional representations of a grommet according to the prior art, in uninstalled and installed states, respectively;

FIG. 4 is a cross-sectional representation of a grommet according to an embodiment of the present development;

DETAILED DESCRIPTION

Figure 5:
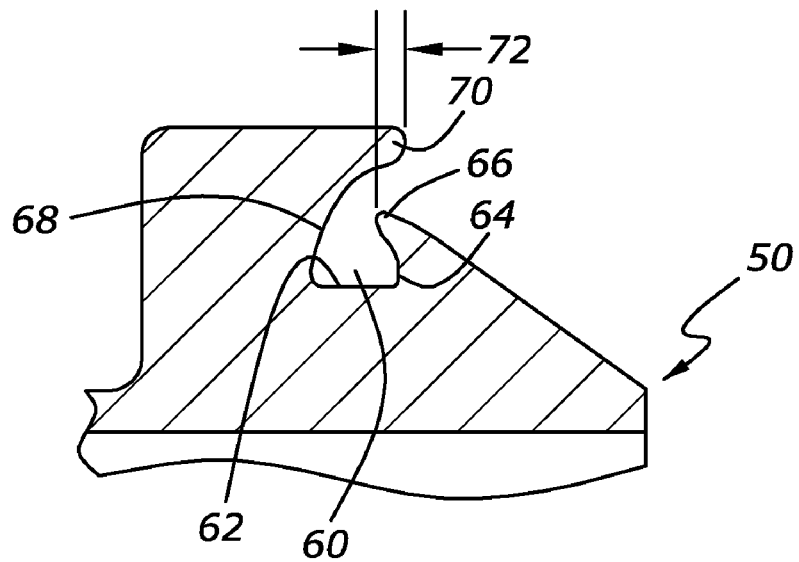
FIGS. 5-7 are cross-sectional representations of a portion of a grommet according to an embodiment of the present development showing details of the channel: uninstalled (FIG. 5), installed with a non-flanged panel (FIG. 6), and installed with a flanged panel (FIG. 7)

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a grommet adapted to be installed into an opening of a body panel on an automotive vehicle. However, the grommet may be incorporated into various other types of vehicles, such as boats, private airplanes, etc. as well as other applications such as a control room of a plant, a refrigeration unit, as two examples. Those of ordinary skill in the art may recognize similar applications or implementations whether or not explicitly described or illustrated.

A cross-section of a grommet 50, according to an embodiment of the present development, is shown in FIG. 4. Grommet 50 has a first tubular portion 52 extending from a body portion 54. Grommet 50 also has a second tubular portion 56 extending from body portion 54. The embodiment shown in FIG. 4 shows axes of first and second tubular ports 52 and 56 being arranged orthogonally. However, this is a non-limiting example as axes of first and second tubular ports 52 and 56 may be collinear, parallel, intersect non-perpendicularly, or at any angle which is consistent for the particular installation. First and second tubular ports 52 and 56 can accommodate a wiring harness (not shown). Tubular port 56 has one or more annular ridges 57 formed on the inside surface of tubular port 56 to assist in retaining a wire harness. As described above, it is desirable for a single grommet design to be used in a variety of applications. Depending on the application, the number of wires in the wiring harness differs. Ridges 57 allow for a greater range in the diameter of wiring bundles to be secured than a smooth internal surface for tubular port 56. Such ridges in grommet 50 allows it to be used in a greater number of applications.

Continuing to refer to FIG. 4, grommet 50 has a service port 58, allowing access through grommet 50 for wires that need to be added after vehicle assembly, for example, if a wire in the wire harness breaks and needs to be replaced without disturbing the wire harness or a service fix requires running an additional wire. Service port 58 is closed on one end with a knob; the knob is cut off when service port 58 is needed.

Channel 60, in FIG. 4, is formed in the periphery of grommet 50 to engage with a panel (not shown). In FIG. 5, a section of grommet 50 with more detail of channel 60 is shown. Channel 60 is defined by a bottom surface 62, a first side wall 64, and a second side wall 68. First side wall 64 has a lip 66. Second side wall 68 has a lip 70 extending generally toward lip 66. The tips of lips 66 and 70 overlap each other by a distance, indicated as 72 in FIG. 5. Distance 72 is at least as thick as a panel with which it is designed to be engaged.

Figure 6:
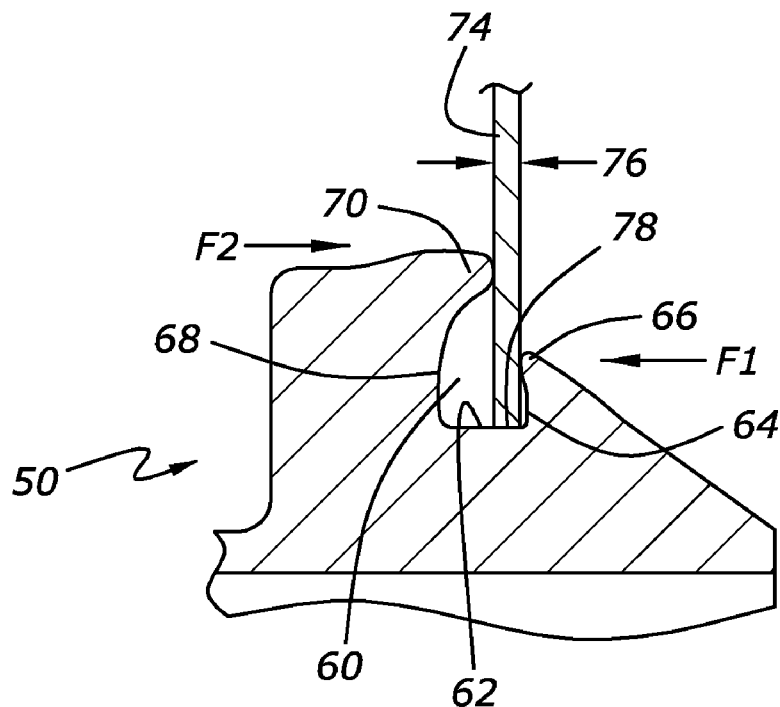

In FIG. 6, a section of the grommet is shown in which a non-flanged panel 74 of thickness 76 is installed into channel 60. Tips 66 and 70 are pushed back from their undeformed position to accommodate panel 74. The deformation of lips 66 and 70 and the resilient material behind lips 66 and 70 cause forces F1 and F2 to be applied to panel 74. The applied forces cause tips of lips 66 and 70 to seal against the faces of panel 74. In addition, when the opening in panel 78 is sized to cooperate with channel 60, a surface 78 of panel 74 seals against bottom surface 62. In this way, the grommet provides three sealing regions between panel 74 and surfaces 62, 64, and 68 defining channel 60.

Figure 7:
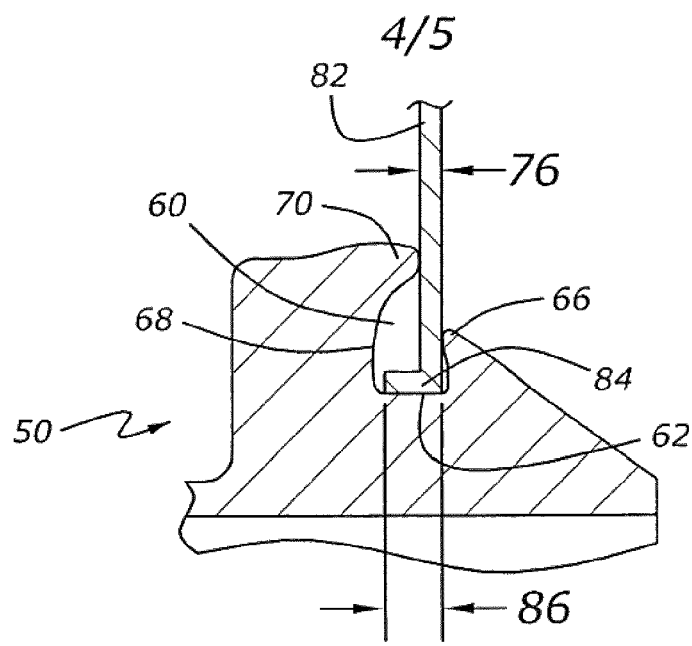

FIG. 7 is very similar to FIG. 6, except that the panel installed, panel 82, has a flange 84. The bottom surface 62 of groove 60 contacts flange 84 over a flange width 86. Like in FIG. 6, triple sealing of panel 82 is provided by: lip 66, lip 70, and surface 62.

Figure 8:
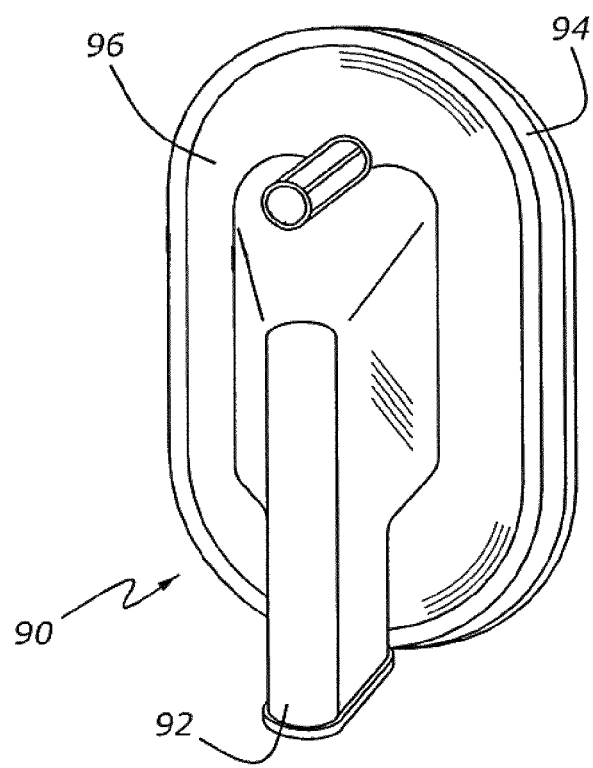
FIGS. 8 and 9 are isometric views of a grommet according to an embodiment of the present development: from an engine compartment view (FIG. 8) and from a passenger compartment view (FIG. 9)
Figure 9:
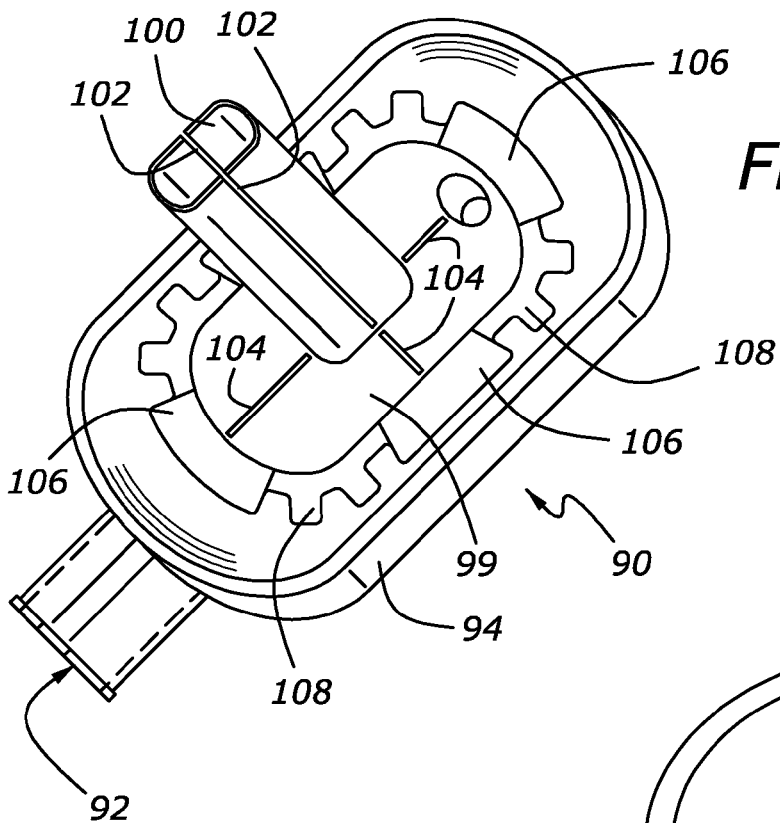
Figure 10:
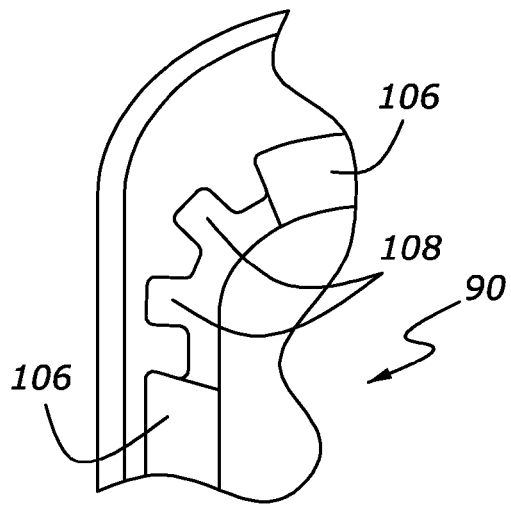
FIG. 10 is portion of a grommet as viewed from a passenger compartment view showing trapezoidal raised flats projecting from the grommet's surface.

A grommet 90 according to an alternate embodiment is shown in FIG. 8. A tubular portion 92 has a generally rectangular cross-section with rounded corners. Herein, tubular refers to a tube of any cross section, not limited to a round tube. Grommet 90 has a wall 94 around its periphery. A surface 96 is extended across one end of wall 94. From the other side of grommet 90, as seen in FIG. 9, a second tubular portion 100 can be viewed; tubular portion 100 has a generally rectangular cross-section with rounded corners. A surface 99 extends across walls 94. By providing two surfaces 96 and 99 across the two ends of wall 94, a greater barrier to noise transmission is provided. (Note that in FIG. 4, the two surfaces are not so clear, because as shown, the cross-section is through the tubes through which the wiring harness travels.) It has been found that by providing a second surface, as opposed to one such as in grommets of FIGS. 2 and 3, the noise level is reduced by about 20%. Surface 99 is not a flat surface but has three-dimensional engagement features. It is known in the prior art that a smooth surface that is cone shaped in the direction of tubular portion 100 requires too high an insertion force due to high friction between the panel opening and the conical surface. To reduce that insertion force, it is known to have an undulating surface. In the embodiment shown in FIG. 9, trapezoidal shaped features 106 and 108 extending out from surface 99 are shown. In the embodiment shown, wider trapezoidal shaped features 106 provide additional stiffness in areas that might be prone to collapse. The remainder of the trapezoidal shaped features 108 is narrower, thereby allowing easier deformation in such regions not prone to collapsing, thereby lessening overall installation force. The trapezoidal shaped features 106 and 108 are shown in more detail in FIG. 10.

In the embodiment shown in FIG. 9, tubular port 100 is cut parallel to its axis in four places around its periphery. The cuts, or slits, are shown continuing into surface 99. In some applications, a subset of wires routed through tubular port 100 is routed in a different direction than other wires. Furthermore, in some applications, there is insufficient packaging space to allow all the wires of the wiring harness to traverse through tubular port 100 before being routed in their various directions. By providing slits 102 through tubular port 100 and slits 104 through surface 99, as many as four groups of wires can be routed into four directions by bending a cut section of tubular port 100 into the desired direction. To seal these various wire groupings, tape is applied. In applications in which all wires in the wiring harness are routed together, at least as far as through tubular port 100, tape can be applied around all sections of tubular port 100 to cause the slits to press together. FIG. 9 showing four slits 102 in tubular port 100 is exemplary, but not limiting.

Figure 11:
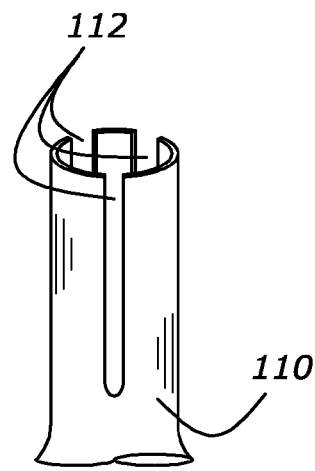
FIG. 11 is an isometric view of a tubular portion of a grommet, according to the prior art.

Referring now to FIG. 11, it is known in the prior art to provide slits 112 in a tubular port 110 of a grommet with the slits molded in. In an application in which the slits are not needed to accommodate wiring that splays out in different directions, the gaps of slits 112, which are several mm in width, aren't readily sealed by winding with tape. Furthermore, in situations in which slits 112 are not cut down the length of tubular port 110 a sufficient distance, tearing of tubular port 110, and possibly the grommet, may occur when attempting to route a subset of the wires of a wiring harness in a particularly tight angle. According to an embodiment of the present disclosure, as shown in FIG. 9, slits 102 are cut into tubular port 100 after molding grommet 90. Slits 102 are cut with as thin a blade as possible, while still maintaining blade integrity: 1 mm thickness in one embodiment. This yields a much narrower slit than with molding. Furthermore, the edges of slits 102 are squarer causing them to mate for a better seal than a molded edge of the prior art. Also, slits 102, as shown in FIG. 9, continue into surface 99 as slits 104, forming one contiguous slit. Thus, depending on the application, a portion of tubular port 100 can be folded back at an extreme angle without having to resort to tearing grommet 90.

The triple sealing feature of the embodiment shown in FIGS. 5-7 presents an improvement over the prior art. Lip 44 and wall 38 (FIG. 2) do not overlap as much as the thickness of the panel in which it is to be installed. Thus, they are easily deformed and act with little force against the panel, and therefore form a weaker seal. The tips of lips 66 and 70, according to an embodiment of the present disclosure (FIG. 5) are hemispherical compared with pointed tip of prior art lip (element 44 of FIG. 2). The sealing force equilibrates between the two sides of the panel with the weaker side controlling the total amount of force applied to the panel. Because lips (66 and 70 of FIG. 5) according to an embodiment of the present disclosure have more material at the tips and in the vicinity of the tips, they are more difficult to deform than prior art lips which are more pointed and thinner, and consequently provide a greater force to form a seal than shown in the prior art. Also, according a prior art example (FIG. 2), behind side wall 38, a hollow 43 is provided. Thus, side wall 38 is easily deformed. According to an embodiment of the present disclosure, no such hollow is formed in the material behind either side wall 64 and 68. Such a configuration as shown in FIG. 5 requires a greater installation force and thereby exerts a greater sealing force when installed.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

What is claimed:

1. A grommet adapted to engage with an opening defined in a panel, the grommet comprising:
- a body portion having a first side and an opposite second side;
- a first tubular portion extending from the first side of the body portion and adapted to receive a wire harness; and
- a second tubular portion extending from the second side of the body portion and communicating with the first tubular portion to receive the wire harness, the second tubular portion having a plurality of annular ridges on an internal surface thereof to assist in retaining the wire harness;
- wherein the body portion defines a peripheral channel for engaging an edge of the opening of the panel when installed, the channel defined by:
- a bottom surface;
- a first side wall extending from a first end of the bottom surface and having a first lip extending generally toward a mid-point of the bottom surface, the first lip being distally located with respect to the bottom surface; and
- a second side wall extending from an opposite second end of the bottom surface and having a second lip extending generally toward the first lip, the second lip being distally located with respect to the bottom surface wherein a tip of the second lip extends beyond the mid-point of the bottom surface and overlaps the first lip.

2. The grommet of claim 1 wherein a cross-section of the tip generally has the shape of a half circle.

3. The grommet of claim 1 wherein the grommet is a unitary molded piece comprised of an elastomeric material.

4. The grommet of claim 1 wherein the body portion has a wall around its periphery in which the channel is formed, the grommet further comprising:
- a first surface extending across a first end of the wall; and
- a second surface extending across a second end of the wall.

* * * * *